United States Patent
DeGowske et al.

(10) Patent No.: US 7,022,040 B2
(45) Date of Patent: Apr. 4, 2006

(54) LOCKING DIFFERENTIAL WITH ELECTROMAGNETIC ACTUATOR

(75) Inventors: Robert J. DeGowske, Richmond, MI (US); David M. Morse, Davisburg, MI (US); John C. Hibbler, Lake Orion, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 127 days.

(21) Appl. No.: 10/809,202

(22) Filed: Mar. 25, 2004

(65) Prior Publication Data

US 2005/0070393 A1    Mar. 31, 2005

Related U.S. Application Data

(63) Continuation-in-part of application No. 10/674,024, filed on Sep. 29, 2003, now Pat. No. 6,958,030.

(51) Int. Cl.
  F16H 48/20    (2006.01)
(52) U.S. Cl. .................. 475/231; 188/161; 192/84.31; 192/84.95
(58) Field of Classification Search ................ 475/231, 475/240, 249; 192/84.31, 84.95, 84.951; 188/31, 161, 163, 171
  See application file for complete search history.

(56) References Cited

U.S. PATENT DOCUMENTS

| 3,133,454 A | 5/1964 | Padlo |
| 3,414,100 A | 12/1968 | Spencer |
| 3,732,752 A | 5/1973 | Louckes et al. |
| 4,150,385 A * | 4/1979 | Ahles .......................... 346/79 |
| 4,263,824 A | 4/1981 | Mueller |
| 4,662,499 A | 5/1987 | Jordan |
| 4,781,078 A | 11/1988 | Blessing et al. |
| 4,805,486 A | 2/1989 | Hagiwara et al. |
| 4,955,853 A | 9/1990 | Bausch |
| 5,019,021 A | 5/1991 | Janson |
| 5,030,181 A | 7/1991 | Keller |
| 5,092,825 A | 3/1992 | Goscenski, Jr. et al. |
| 5,098,360 A | 3/1992 | Hirota |
| 5,350,340 A | 9/1994 | Paul et al. |
| 5,366,421 A | 11/1994 | Hirota |
| 5,816,971 A | 10/1998 | Zentmyer et al. |
| 5,853,165 A * | 12/1998 | Kuivamaki ................ 254/366 |
| 5,911,643 A | 6/1999 | Godlew et al. |
| 6,013,004 A | 1/2000 | Gage et al. |
| 6,083,134 A | 7/2000 | Godlew |
| 6,428,441 B1 | 8/2002 | Hunt |
| 6,436,002 B1 | 8/2002 | Ishikawa et al. |
| 6,450,914 B1 | 9/2002 | Irwin et al. |
| 6,454,068 B1 | 9/2002 | Arai et al. |
| 6,460,677 B1 | 10/2002 | Roscoe |
| 6,470,988 B1 | 10/2002 | Beesley |

(Continued)

FOREIGN PATENT DOCUMENTS

JP    2-221743    *    9/1990    ................. 475/231

*Primary Examiner*—Ha Ho
(74) *Attorney, Agent, or Firm*—Harness, Dickey & Pierce P.L.C.

(57) ABSTRACT

A differential assembly includes a case, a pair of pinion gears, a pair of side gears and an electrically operable coupling including an electromagnet. The coupling selectively drivingly interconnects one of the side gears and the case. The electromagnet of the coupling is axially moveable within the case to selectively place the differential assembly in an open or a locked condition.

21 Claims, 9 Drawing Sheets

U.S. PATENT DOCUMENTS

| | | |
|---|---|---|
| 6,478,708 B1 | 11/2002 | Krisher |
| 6,488,606 B1 | 12/2002 | Young et al. |
| 6,503,167 B1 | 1/2003 | Sturm |
| 6,733,411 B1 * | 5/2004 | Kaplan et al. ................. 475/88 |
| 6,796,412 B1 * | 9/2004 | Teraoka ....................... 192/35 |
| 6,832,972 B1 * | 12/2004 | Ishikawa .................... 475/223 |
| 2002/0032096 A1 | 3/2002 | Gassmann |
| 2002/0155913 A1 | 10/2002 | Fusegi et al. |

* cited by examiner

LOCKING DIFFERENTIAL WITH ELECTROMAGNETIC ACTUATOR

CROSS-REFERENCE TO RELATED APPLICATIONS

This application is a continuation-in-part of U.S. patent application Ser. No. 10/674,024, filed on Sep. 29, 2003 now U.S. Pat. No. 6,958,030.

BACKGROUND OF THE INVENTION

The present invention generally relates to differentials for motor vehicles and, more particularly, to a locking differential employing an electromagnet to control operation of the differential.

As is known, many motor vehicles are equipped with driveline systems including differentials which function to drivingly interconnect an input shaft and a pair of output shafts. The differential functions to transmit drive torque to the output shafts while permitting speed differentiation between the output shafts.

Conventional differentials, such as a parallel-axis helical differential, include a pair of side gears fixed for rotation with the output shafts and two or more sets of meshed pinion gears mounted within a differential case. However, the conventional differential mechanism has a deficiency when a vehicle is operated on a slippery surface. When one wheel of the vehicle is on a surface having a low coefficient of friction, most or all of the torque will be delivered to the slipping wheel. As a result, the vehicle often becomes immobilized. To overcome this problem, it is known to provide a mechanical differential where an additional mechanism limits or selectively prevents differentiation of the speed between the output shafts. Typically, the mechanical device to provide the limited-slip or non-slip function is a friction clutch. The friction clutch is a passive device which limits the differential speed between the output shafts only after a certain differential speed has been met. Additionally, such mechanical devices may not be selectively disengaged during operation of anti-lock braking systems or vehicle traction control systems. For example, four-wheel anti-lock braking systems attempt to measure and control the rotational speed of each wheel independently. If a mechanical type limited slip differential is present, independent control of the speed of each wheel coupled to a differential is no longer possible. Accordingly, it would be desirable to provide an improved differential which may be actively controlled in conjunction with other control systems present on the vehicle.

SUMMARY OF THE INVENTION

The present invention relates to a differential system including a case, a pair of pinion gears, a pair of side gears and an electrically operable coupling including an electromagnet. The coupling selectively drivingly interconnects one of the side gears and the case. In one instance, the present invention includes an axially moveable actuator having an electromagnet. The electromagnet may be selectively actuated to move a ring into engagement with one of the side gears of the differential. In this manner, the differential may function as an "open" differential when the ring is disconnected from the side gear or as a "locked" differential when the ring engages the side gear thereby fixing the side gear to the case.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The present invention is directed to an improved differential for a drivetrain of a motor vehicle. The differential of the present invention includes an actuator operable to place the differential in an "open" or "locked" condition. It should be appreciated that the differential of the present invention may be utilized with a wide variety of driveline components and is not intended to be specifically limited to the particular application described herein. In addition, the actuator of the differential of the present invention may be used in conjunction with many types of differentials such as a bevel gear design which are of a completely open or limited-slip variety.

Figure 1:
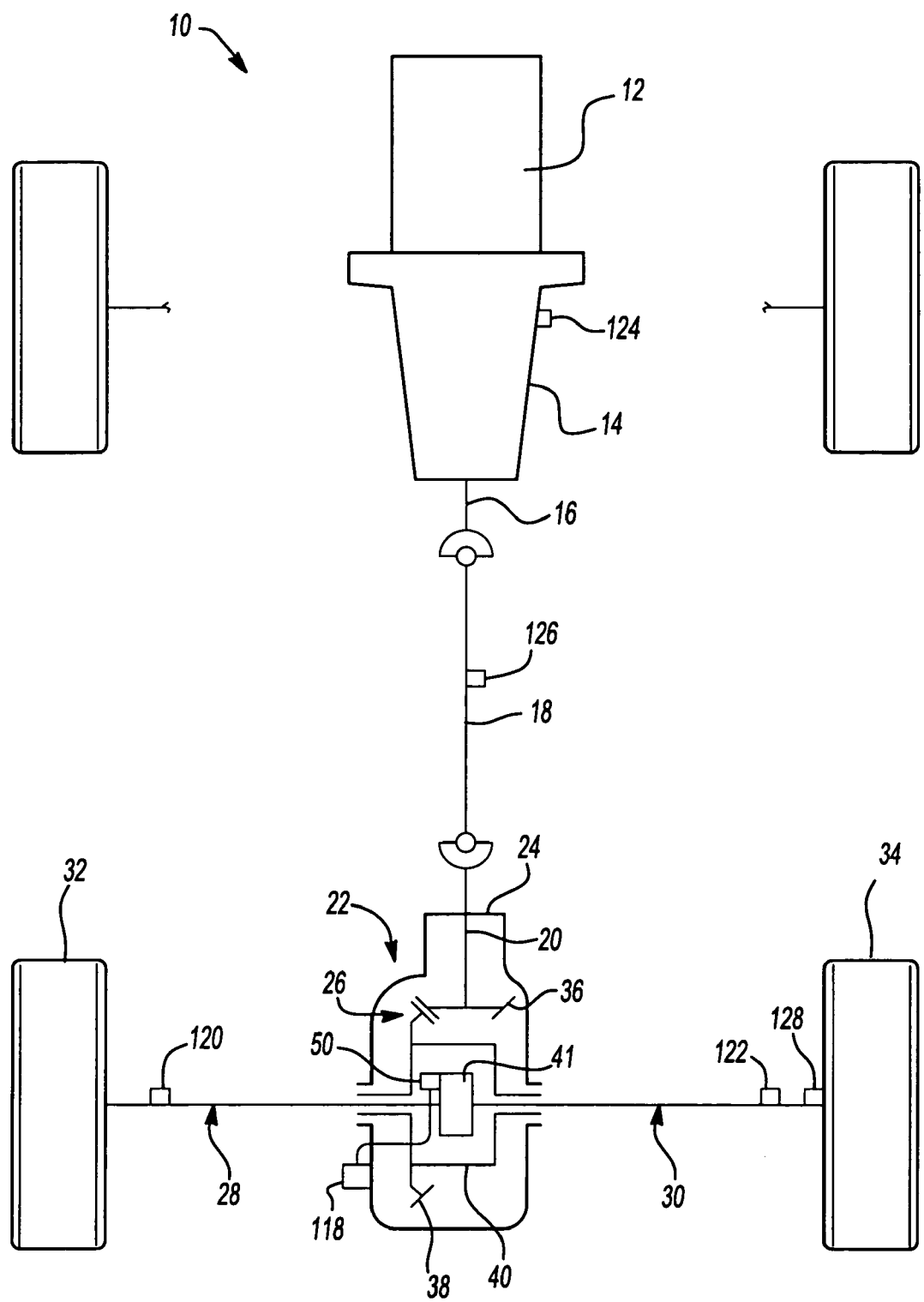
FIG. 1 is a schematic view of an exemplary motor vehicle drivetrain including a differential assembly of the present invention.

With reference to FIG. 1, a drivetrain 10 for an exemplary motor vehicle is shown to include an engine 12, a transmission 14, having an output shaft 16 and a propeller shaft 18 connecting output shaft 16 to a pinion shaft 20 of a rear axle assembly 22. Rear axle assembly 22 includes an axle housing 24, a differential assembly 26 supported in axle housing 24 and a pair of axle shafts 28 and 30 respectively interconnected to left and right and rear wheels 32 and 34. Pinion shaft 20 has a pinion gear 36 fixed thereto which drives a ring gear 38 that is fixed to a differential case 40 of differential assembly 26. A gearset 41 supported within differential case 40 transfers rotary power from differential case 40 to axle shafts 28 and 30, and facilitates relative rotation (i.e., differentiation) therebetween. Thus, rotary power from engine 12 is transmitted to axle shafts 28 and 30 for driving rear wheels 32 and 34 via transmission 14, propeller shaft 18, pinion shaft 20, differential case 40 and gearset 41. While differential assembly 26 is depicted in a rear-wheel drive application, the present invention is contemplated for use in differential assemblies installed in trailing axles, transaxles for use in front-wheel drive vehicles, transfer cases for use in four-wheel drive vehicles and/or any other known vehicular driveline application.

Figure 2:
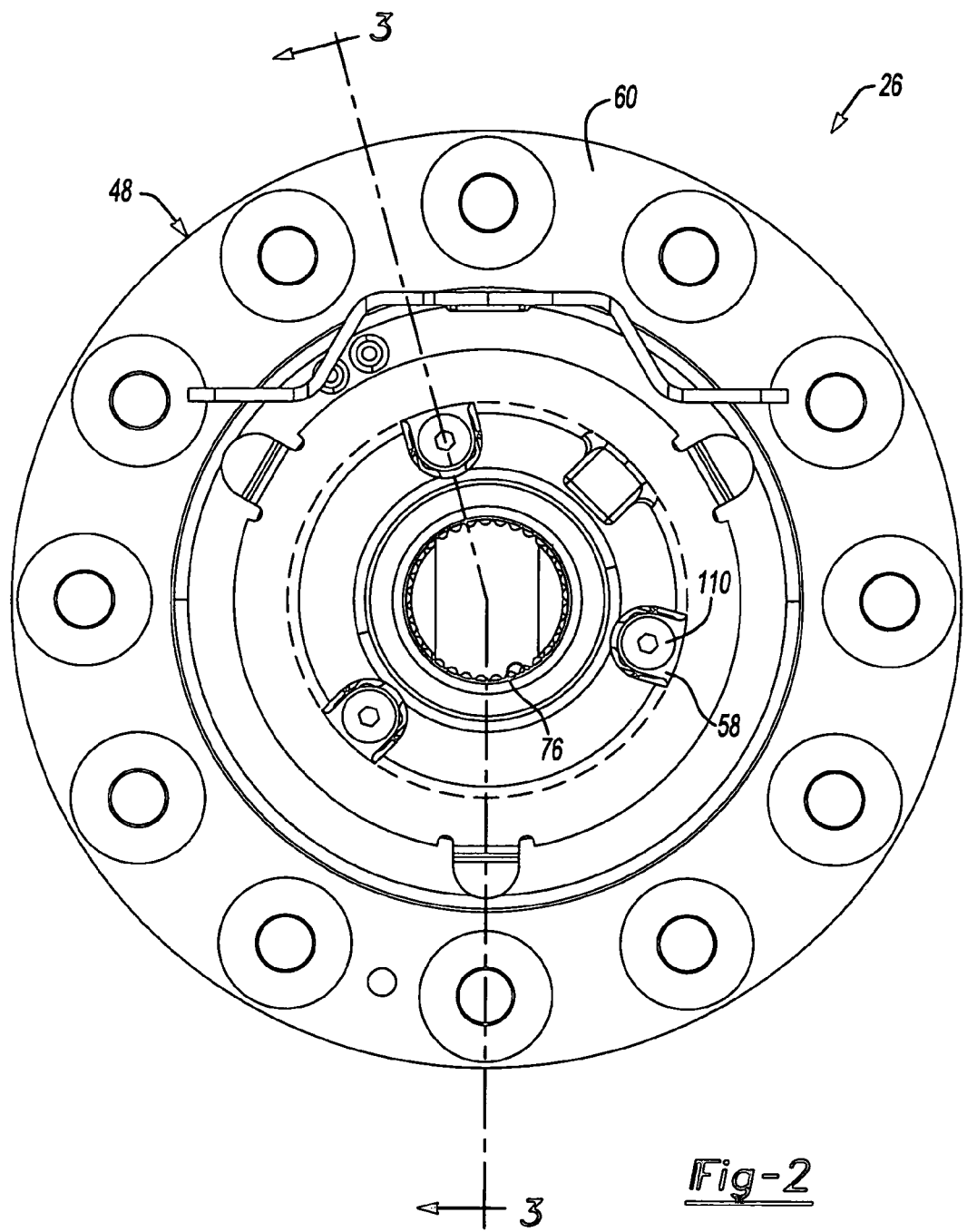
FIG. 2 is an end view of a first embodiment differential assembly of the present invention.
Figure 3:
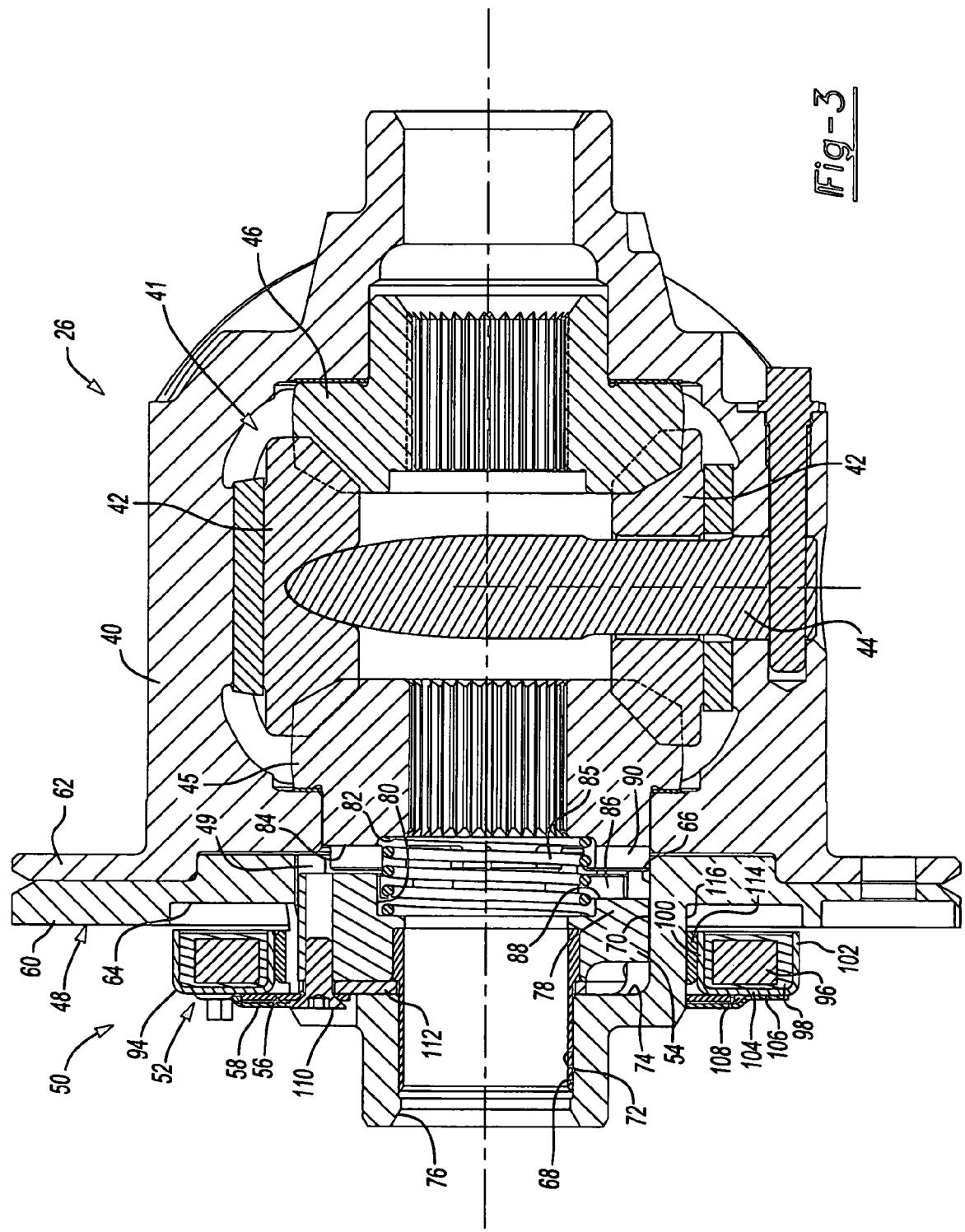
FIG. 3 is a cross-sectional side view of the differential of the present invention.

FIGS. 2 and 3 depict differential assembly 26 including differential case 40 and gearset 41. Gearset 41 includes a pair of pinion gears 42 rotatably supported on a cross shaft 44. First and second side gears 45 and 46 are drivingly interconnected to pinion gears 42 and axle shafts 28 and 30. Differential assembly 26 also includes an actuator assembly 50 operable to selectively couple side gear 45 to differential case 40, thereby placing differential assembly 26 in a fully locked condition.

A cap 48 is coupled to differential case 40 to define a pocket 49 for receipt of actuator assembly 50. Actuator assembly 50 includes a solenoid assembly 52, an actuating ring 54, a draw plate 56, and a retainer 58. Cap 48 includes a flange 60 coupled to a flange 62 of case 40. Flange 60 of cap 48 includes a recess 64 sized to receive solenoid assembly 52 during actuation. Cap 48 includes a pair of stepped bores 66 and 68 which define pocket 49. Specifically, first bore 66 includes an annular surface 70 while second bore 68 includes an annular surface 72. First bore 66 includes an end face 74 radially inwardly extending from annular surface 70. An aperture 76 extends through the cap 48 and is in communication with second bore 68 where aperture 76 and second bore 68 are sized to receive the portion of the axle shaft.

Actuating ring 54 includes a generally hollow cylindrical body 78 having an annular recess 80 formed at one end. Side gear 45 includes a similarly sized annular recess 82 formed in an outboard face 84. A compression spring 85 is positioned between actuating ring 54 and side gear 45 within annular recesses 80 and 82. A plurality of axially extending dogs 86 protrude from an end face 88 of actuating ring 54. A corresponding plurality of dogs 90 axially extend from face 84 of side gear 45. Actuating ring 54 is moveable from a disengaged position as shown in FIG. 3 to an engaged position (not shown). In the disengaged position, dogs 86 of actuating ring 54 are released from engagement with dogs 90 of side gear 45. In contrast, when actuating ring 54 is moved to its engaged position, dogs 86 engage dogs 90 to rotatably fix side gear 45 to differential case 40.

Solenoid assembly 52 includes a metallic cup 94 and a coil of wire 96. The wire is positioned within cup 94 and secured thereto by an epoxy 98. Cup 94 includes an inner annular wall 100, an outer annular wall 102 and an end wall 104 interconnecting annular walls 100 and 102. Retainer 58 is a substantially disc-shaped member having an outer edge 106 mounted to end wall 104 of cup 94. Retainer 58 is spaced apart from end wall 104 to define a slot 108. Draw plate 56 is positioned within slot 108 and coupled to actuating ring 54 via a plurality of fasteners 110. A washer 112 is positioned between cap 48 and actuating ring 54. Preferably, washer 112 is constructed from a non-ferromagnetic material so as to reduce any tendency for actuating ring 54 to move toward end face 74 of metallic cap 48 instead of differential case 40 during energization of solenoid assembly 52. A bearing 114 supports cup 94 on an outer journal 116 of cap 48.

Coil 96 is coupled to a controller 118 (FIG. 1) which operates to selectively energize and de-energize coil 96. During coil energization, a magnetic field is generated by current passing through coil 96. The magnet field causes actuator assembly 50 to be drawn toward flange 60 of cap 48. As solenoid assembly 52 enters recess 64, dogs 86 of actuating ring 54 engage dogs 90 of side gear 45. Once the dogs are engaged, actuating ring 54 is in its engaged position and differential assembly 26 is in a fully locked condition. One skilled in the art will appreciate that the axially moveable electromagnet of the present invention provides a simplified design having a reduced number of components. Additionally, the present invention utilizes the entire differential case as the armature for the electromagnet. This allows a more efficient use of the available magnetic force. These features allow a designer to reduce the size of the electromagnet because the armature more efficiently utilizes the electromotive force supplied by the electromagnet. Such a compact design allows for minor modification of previously used components and packaging with a standard sized axle housing.

To place differential assembly 26 in the open, unlocked condition, current is discontinued to coil 96. The magnetic field ceases to exist once current to coil 96 is stopped. At this time, compression in spring 85 causes actuator assembly 50 to axially translate and disengage dogs 86 from dogs 90. Accordingly, side gear 45 is no longer drivingly coupled to differential case 40, thereby placing differential assembly 26 in the open condition. It should also be appreciated that actuation and deactuation times are very short due to the small number of moving components involved. Specifically, no relative ramping or actuation of other components is required to cause engagement or disengagement of dogs 86 and dogs 90.

Electronic controller 118 controls the operation of actuator assembly 50. Electronic controller 118 is in receipt of data collected by a first speed sensor 120 and a second speed sensor 122. First speed sensor 120 provides data corresponding to the rotational speed of axle shaft 28. Similarly, second speed sensor 122 measures the rotational speed of axle shaft 30 and outputs a signal to controller 118 indicative thereof. Depending on the data collected at any number of vehicle sensors such as a gear position sensor 124, a vehicle speed sensor 126, a transfer case range position sensor or a brake sensor 128, controller 118 will determine if an electrical signal is sent to coil 96. Controller 118 compares the measured or calculated parameters to predetermined values and outputs an electrical signal to place differential assembly 26 in the locked position only when specific conditions are met. As such, controller 118 assures that an "open" condition is maintained when events such as anti-lock braking occur. Limiting axle differentiation during anti-lock braking would possibly counteract the anti-lock braking system. Other such situations may be programmed within controller 118.

Figure 4:
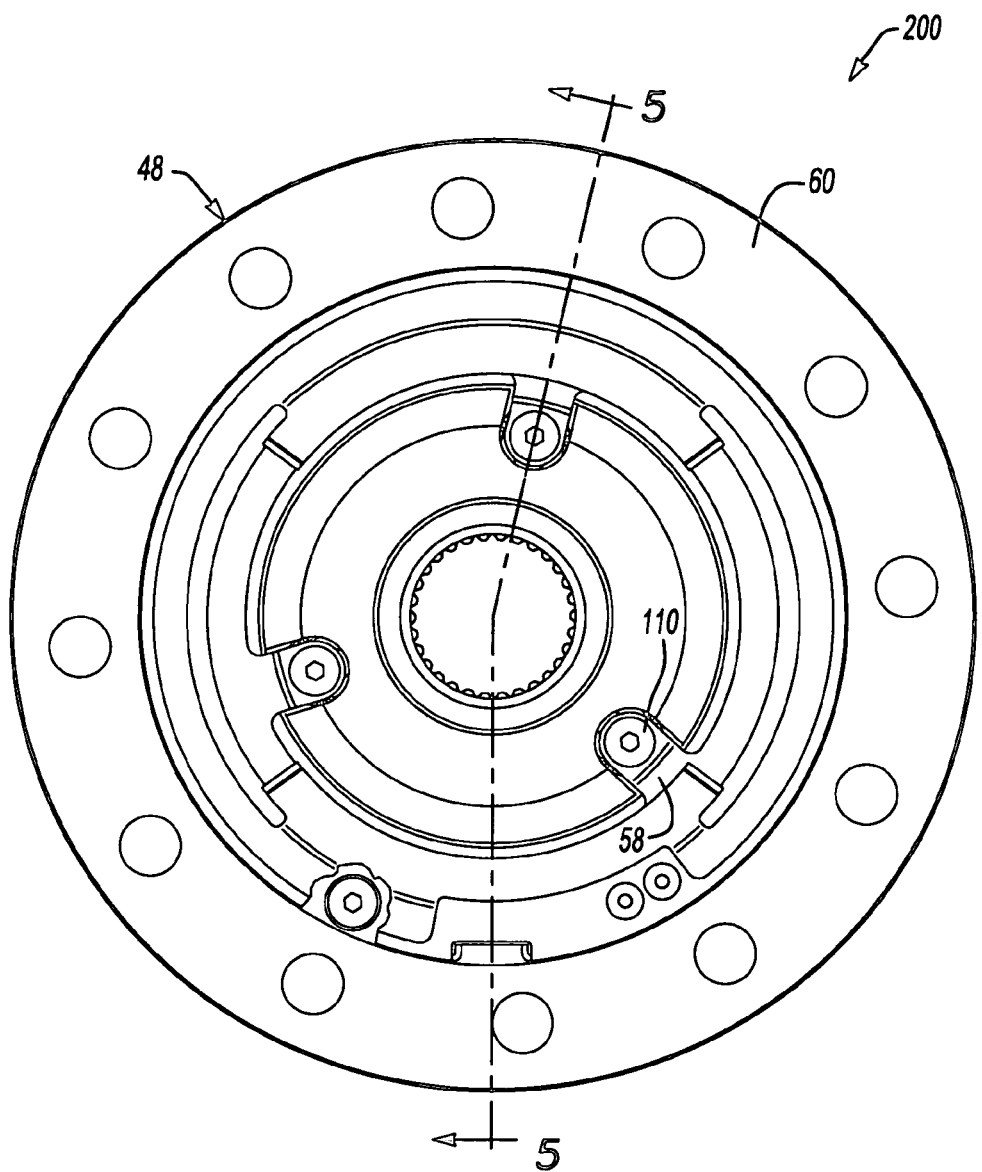
FIG. 4 is an end view of a second embodiment differential assembly of the present invention.
Figure 5:
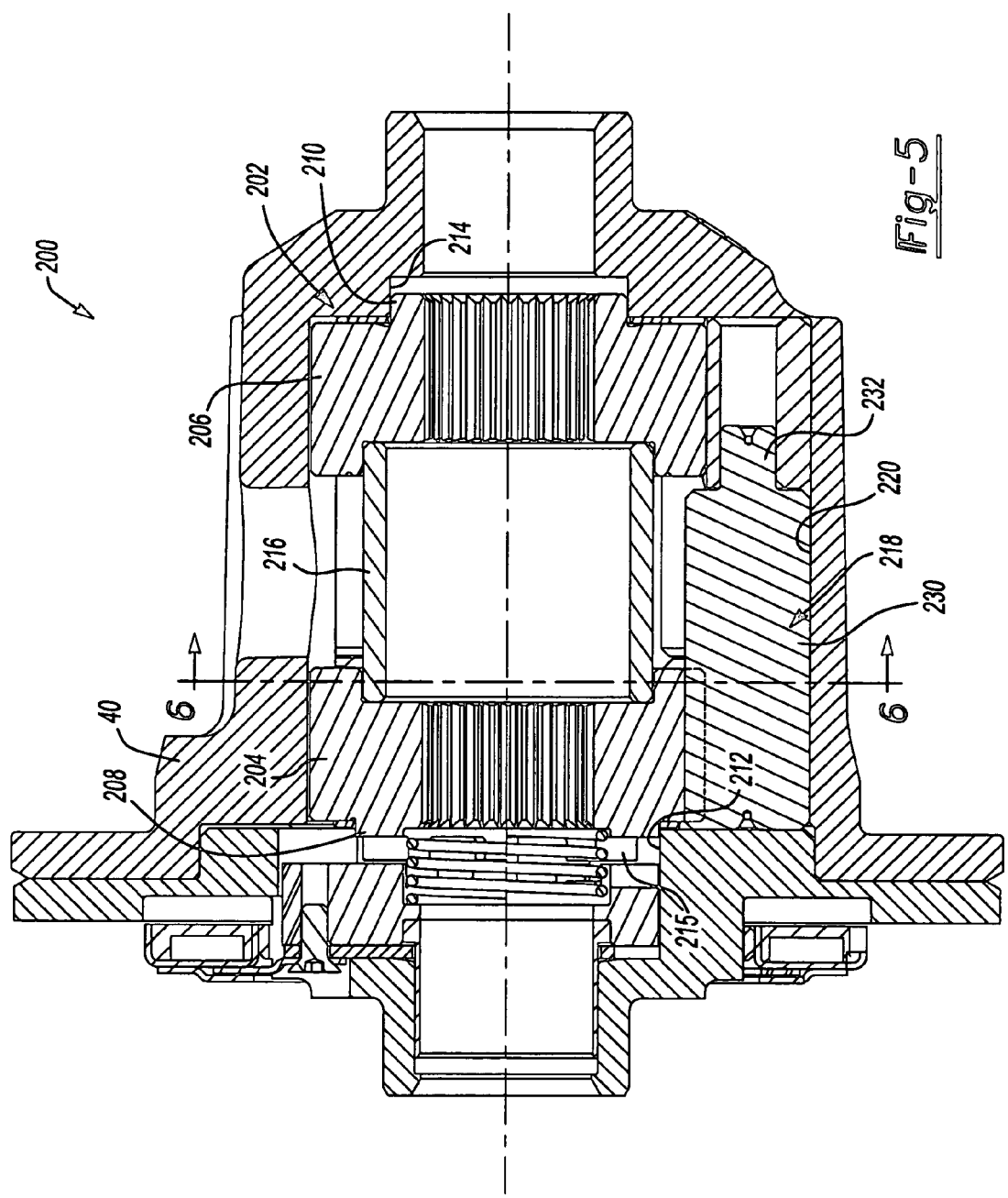
FIG. 5 is a cross-sectional side view of the second embodiment of the present invention.
Figure 6:
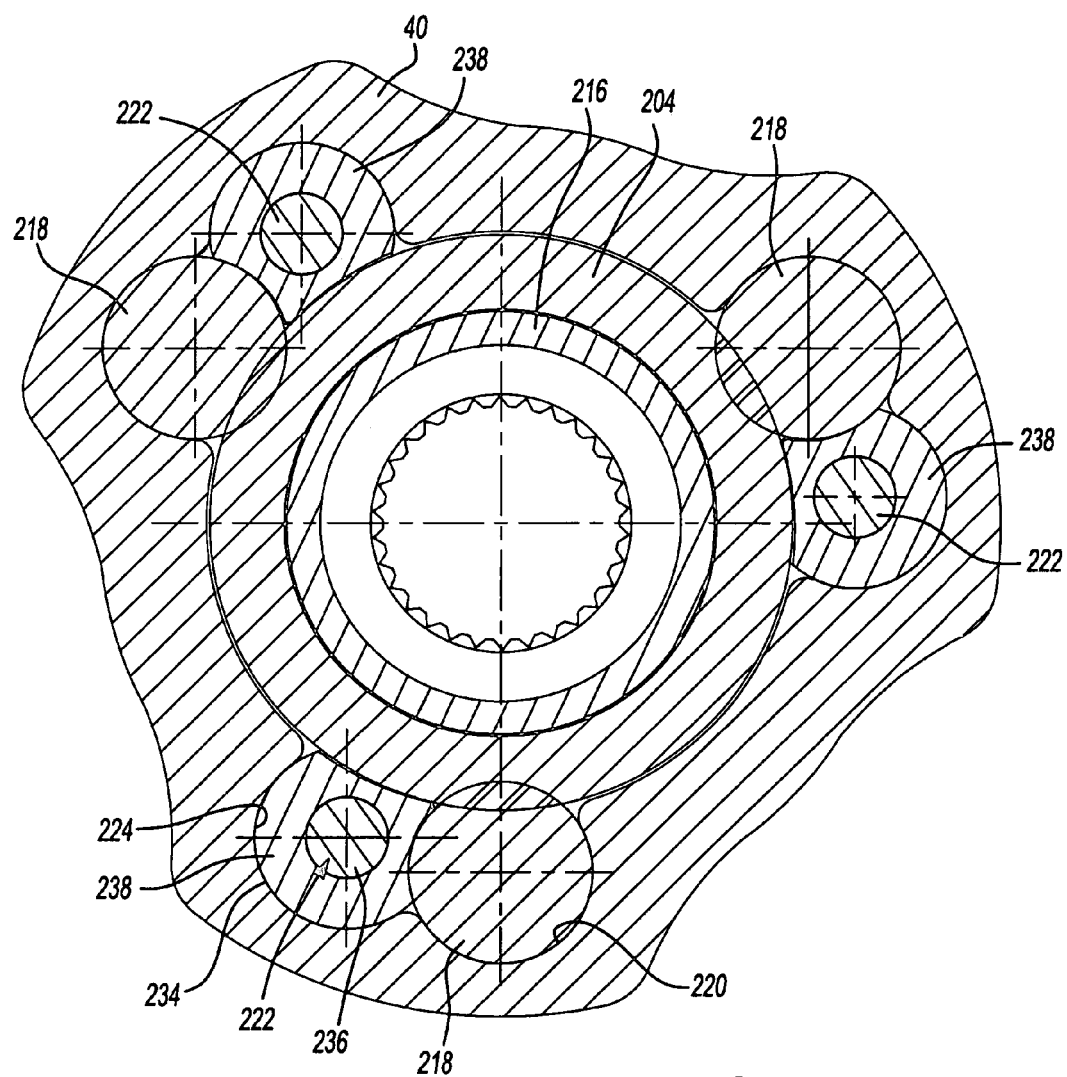
FIG. 6 is a cross-sectional end view of the second embodiment differential assembly.

FIGS. 4–6 depict an alternate embodiment differential assembly 200. Differential assembly 200 is substantially similar to differential assembly 26 except that differential assembly 200 relates to a parallel axis helical differential. Accordingly, like elements will retain the reference numerals previously introduced.

Differential assembly 200 includes a planetary gearset 202 which is operable for transferring drive torque from differential case 40 to axle shafts 28 and 30 in a manner facilitating speed differential and torque biasing therebetween. Gearset 202 includes a pair of helical side gears 204 and 206 having internal splines that are adapted to mesh with external splines on corresponding end segments of axle shafts 28 and 30. In addition, side gears 204 and 206 respectively include hubs 208 and 210 which are seated in corresponding annular sockets 212 and 214. Side gear 204 also includes a plurality of axially extending dogs 215. Gearset 202 further includes a spacer block 216 for maintaining side gears 204 and 206 and axle shafts 28 and 30 in axially spaced relation to each other. Once installed, spacer block 216 is free to rotate with respect to either axle shaft 28 and 30 and differential case 40.

Planetary gearset 202 also includes a first set of helical pinions 218 journally supported in first gear pockets 220 formed in differential case 40. A set of second helical pinions 222 are journally supported in second gear pockets 224 formed in differential case 40. While not limited thereto, differential 200 is shown to include three first pinions 218 and three second pinions 222 arranged in meshed pairs, referred to as meshed pinion sets. Gear pockets 220 and 224 are longitudinally extending, elongated, partially cylindrical bores and are formed in paired overlapping sets such that they communicate with an interior volume of differential case 40.

First pinions 218 are shown to include a long, larger diameter gear segment 230 and a short, smaller diameter stub shaft segment 232. When installed in first gear pockets 220, first pinions 218 are arranged such that the teeth of gear segments 230 are meshed with the teeth of side gear 204 while their outer diameter tooth end surfaces are journally supported by the bearing wall surface of pockets 220.

Likewise, second pinions 222 are shown to include a long, larger diameter gear segment 234 and a short, smaller diameter stub shaft 236. When installed in second gear pockets 224, second pinions are arranged such that the teeth of gear segments 234 are meshed with the teeth of side gear 206 while their outer diameter tooth end surfaces are journally supported by the bearing wall surface of second gear pockets 224. Since pinions 218 and 222 are arranged in meshed sets, gear segment 230 of one of first pinions 218 also meshes with gear segment 234 and the corresponding one of second pinions 222. Preferably, gear segments 230 and 234 are of an axial length to effectively maintain meshed engagement substantially along their entire length.

A set of support members 238 support stub shaft sections 232 on each of pinions 218 against the bearing wall surface of its corresponding first gear pocket 220 and against the outer diameter tooth end surfaces of side gear 206 and gear segment 234 of its meshed second pinion. Support members 238 similarly support stub shaft segment 236 of second pinions 222. A more complete description of parallel-axis gear differentials is found in U.S. Pat. No. 6,013,004 to Gage et al. which is hereby incorporated by reference.

As previously described, actuator assembly 50 is positioned within a pocket 49 defined by cap 48 and differential case 40. Actuator assembly 50 is selectively energizable to cause dogs 86 of actuating ring 54 to engage dogs 215 of side gear 204. Differential assembly 200 functions substantially similarly to differential assembly 26 in that it is placed in a locked mode when dogs 86 engage dogs 215. The differential assembly can be placed in an open mode by discontinuing current supply to coil 96. Compression spring 85 axially displaces actuator assembly 50 to cause dogs 86 to disengage from dogs 215.

While a rear drive axle assembly has been described in detail, it should be appreciated that the differential system of the present invention is not limited to such an application. Specifically, the differential system of the present invention may be used in transaxles for front-wheel drive vehicles, transfer cases for use in four-drive vehicles and/or a number of other vehicular driveline applications.

Figure 7:
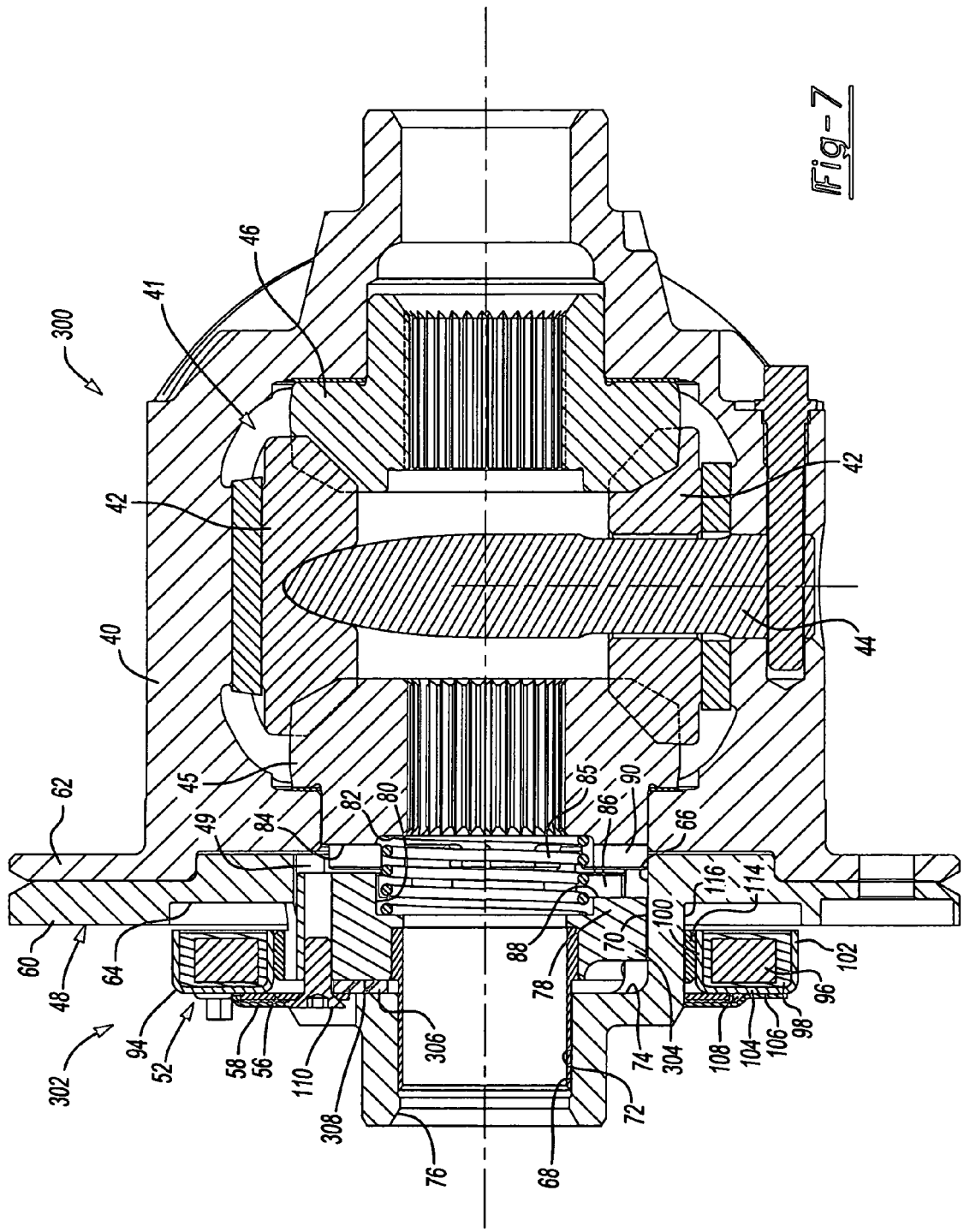
FIG. 7 is a cross-sectional side view of another embodiment of the present invention.
Figure 10:
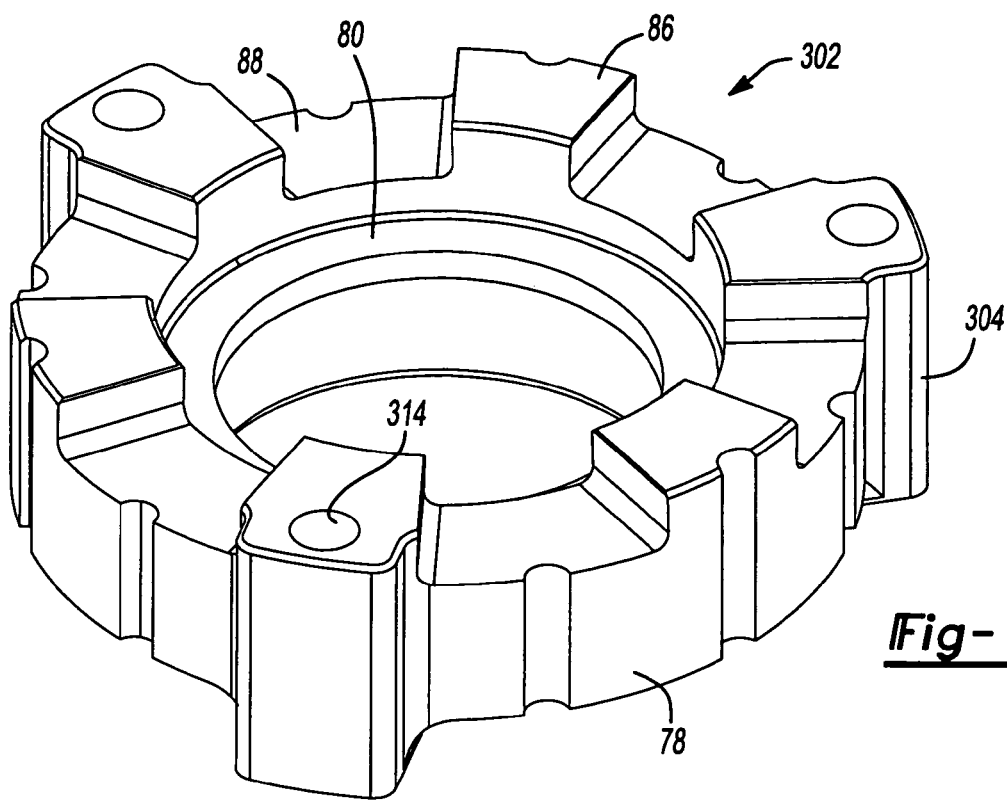
FIG. 10 is perspective view of a actuating ring assembly for use in the embodiment depicted in FIG. 7.
Figure 11:
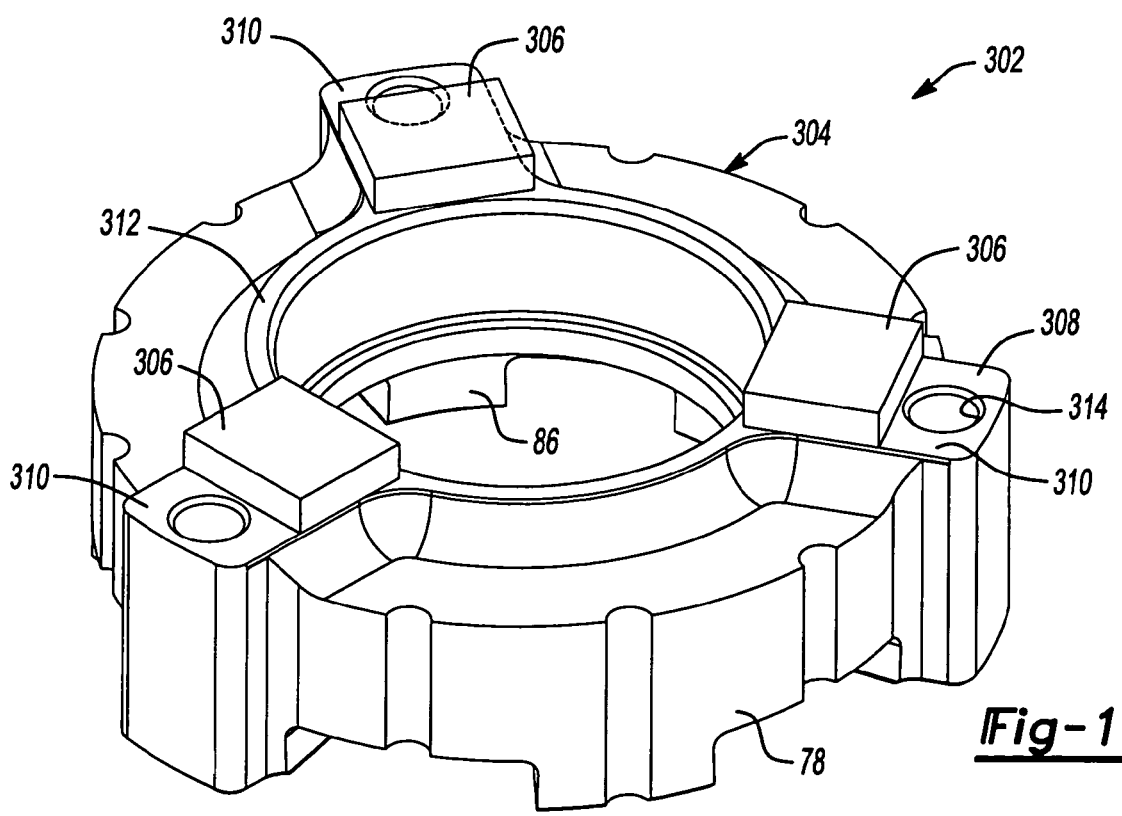
FIG. 11 is another perspective view of the actuating ring assembly depicted in FIG. 10.

FIGS. 7, 10 and 11 depict another alternate embodiment differential assembly 300. Differential assembly 300 is substantially similar to the previously described differential assemblies except that differential assembly 300 includes an alternate embodiment actuator assembly 302. For clarity, like elements will retain the previously introduced reference numerals.

Figure 8:
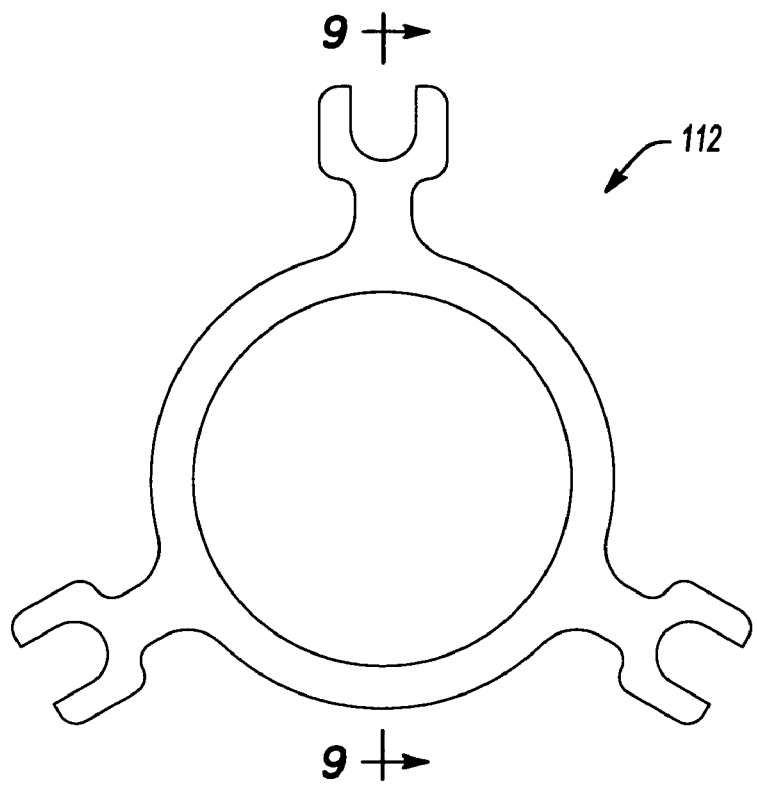
FIG. 8 is a plan view of a non-magnetizable washer used in conjunction with the first and second embodiments of the present invention.
Figure 9:
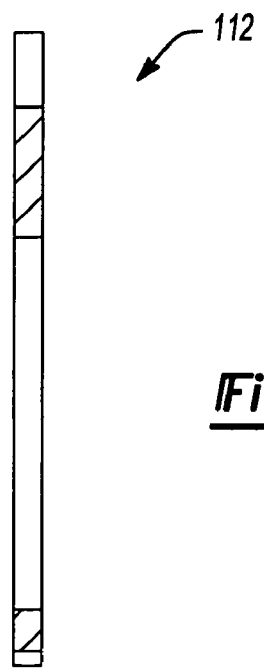
FIG. 9 is a side view of the washer depicted in FIG. 8.

Differential assembly 300 alleviates the need for washer 112 that was previously positioned between actuator assembly 50 and cap 48. FIGS. 8 and 9 depict washer 112 of differential assemblies 26 and 200. As previously mentioned, washer 112 is constructed from a non-magnetizable material such as aluminum to reduce the tendency for the magnetizable actuating ring 54 to be attracted toward metallic cap 48 instead of differential case housing 40 during energization of solenoid assembly 52.

FIGS. 10 and 11 depict actuator assembly 302 for use with differential assembly 300. Actuator assembly 302 includes an actuating ring 304 with a plurality of pads 306 coupled to actuating ring 304. Actuating ring 304 is substantially similar to actuating ring 54. Specifically, actuating ring 304 includes a generally hollow cylindrical body 78 having annular recess 80 formed at one end. Dogs 86 axially extend from end face 88. Actuating ring 304 is preferably constructed from a magnetizable material. Magnetizable materials include at least those classified as ferromagnetic and ferrimagnetic. Actuating ring 304 includes a substantially planar surface 308 having three radially extending portions 310 interconnected by substantially circular portion 312. An aperture 314 extends through each radially extending portion 310. Apertures 314 are preferably internally threaded for receipt of fasteners 110. Pads 306 are depicted in FIG. 11 as substantially rectangular blocks coupled to radially extending portions 310. Pads 306 may be constructed from any number of non-magnetizable materials including plastic, rubber or another polymer. The pads may be affixed to planar surface 308 by a gluing operation or pads 306 may be molded to actuator ring 304. Although pads 306 are depicted as individually spaced apart elements in FIG. 11, it is within the scope of the present invention to use a one-piece spacer coupled to planar surface 308. The one-piece spacer may be adhesively bonded to or molded to actuator ring 304.

The use of a polymer spacer or pads coupled to actuating ring 304 defines a cost reduced differential assembly compared to an assembly using a separate aluminum washer. Furthermore, because the spacer or pads 306 are coupled to actuating ring 304, fewer parts need to be inventoried, handled and assembled. By integrating the spacer and actuating ring into a unitary assembly, the tendency for an assembler to inadvertently eliminate a component is reduced.

In operation, spacer or pads 306 provide a minimum spacing between planar surface 308 of actuating ring 304 and end face 74 of cap 48. This minimum spacing assures that coil 96 generates an attracting force attempting to move actuating ring 304 toward the engaged position that is greater than the force supplied by spring 85 plus the force attempting to move actuating ring 304 toward the disengaged position. Accordingly, actuator assembly 302, including actuating ring 304, moves from the disengaged position to the engaged position when coil 96 is energized.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. A differential system comprising:
a rotatable case defining an interior cavity;
a pair of pinion gears rotatably supported in said interior cavity;
a pair of side gears rotatably supported in said interior cavity, wherein each of said pinion gears drivingly engages each of said side gears; and
an electrically operable coupling including a moveable electromagnet and a non-magnetic spacer coupled thereto, said coupling being operable to selectively connect one of said side gears to said case in response to movement of said electromagnet toward said side gears, said spacer positioning the electromagnet to reduce a force urging said coupling away from said side gears.

2. The differential system of claim 1 wherein said spacer limits the travel of said coupling away from said side gears.

3. The differential system of claim 2 further including a ring selectively engageable with said one of said side gears, said ring being rotationally retained by said case and axially moveable relative to said case.

4. The differential system of claim 3 wherein said case includes a removable cap, said spacer being positioned between said cap and said ring.

5. The differential system of claim 4 wherein said cap includes a recess within which a portion of said coupling is positioned.

6. The differential system of claim 5 further including a spring biasing said ring toward a position disengaged from said first side gear.

7. The differential system of claim 6 wherein said pinion gears rotate about a first common axis and wherein said first and second side gears rotate about a second common axis, said first common axis being positioned substantially orthogonal to said second common axis.

8. The differential system of claim 6 wherein said pinion gears rotate about axes parallel to and offset from one another.

9. The differential system of claim 1 wherein said case includes a portion positioned on an opposite side of said coupling as said pair of side gears, wherein during energization of said electromagnet, said electromagnet is attracted toward said portion of said case by a force less than a force attracting said electromagnet toward said side gears.

10. A differential system comprising:
a case defining an interior cavity, said case having a bore communicating with said interior cavity;
a pair of pinion gears positioned within said interior cavity and rotatably coupled to said case;
first and second side gears positioned within said interior cavity in meshing engagement with said pinion gears and rotatably coupled to said case;
an electromagnetic actuator having a coil moveable within said bore between an engaged position and a disengaged position, said case being drivingly coupled to said first side gear when said coil is in said engaged position;
a spring biasing said actuator toward said disengaged position; and
a spacer coupled to said actuator, said spacer defining the position of said actuator relative to said engaged position, wherein a force attracting said actuator toward said engaged position is greater than a force provided by said spring and a force attracting said actuator toward said disengaged position such that said actuator moves toward said engaged position when an electrical current is passed through said coil.

11. The differential system of claim 10 wherein said electromagnetic actuator includes an axially slidable ring coupled to said coil, said ring being selectively engageable with said first side gear.

12. The differential system of claim 11 wherein said spacer is integrally molded to said ring to define a unitary component.

13. The differential system of claim 11 wherein said ring includes a plurality of dogs that are selectively engageable with a plurality of dogs extending from said first side gear.

14. The differential system of claim 11 wherein said spacer includes a plurality of spaced apart pads coupled to said ring.

15. A differential system comprising:
a rotatable case defining an interior cavity;
a pair of pinion gears rotatably supported in said interior cavity;
a pair of side gears rotatably supported in said interior cavity, wherein each of said pinion gears drivingly engages each of said side gears; and
an electrically operable coupling including a moveable electromagnet and a non-magnetic spacer coupled thereto, said coupling being operable to selectively connect one of said side gears to said case in response to movement of said electromagnet, said spacer maintaining at least a predetermined distance between said coupling and a magnetizable portion of said case.

16. The differential system of claim 15 wherein said magnetizable portion of said case is positioned on an opposite side of said coupling as said pair of side gears.

17. The differential system of claim 16 wherein said coupling includes an axially slidable ring engageable with one of said side gears and wherein said spacer is coupled to said ring.

18. The differential system of claim 17 wherein said spacer includes a plurality of spaced apart pads coupled to said ring.

19. The differential system of claim 18 further including a spring biasing said ring toward a position disengaged from one of said side gears.

20. The differential system of claim 19 wherein said spacer is engaged with said magnetizable portion of the case when said ring is in said position disengaged from one of said side gears.

21. The differential system of claim 17 wherein said spacer is molded to said ring to define a unitary member.

* * * * *